Figure 1:
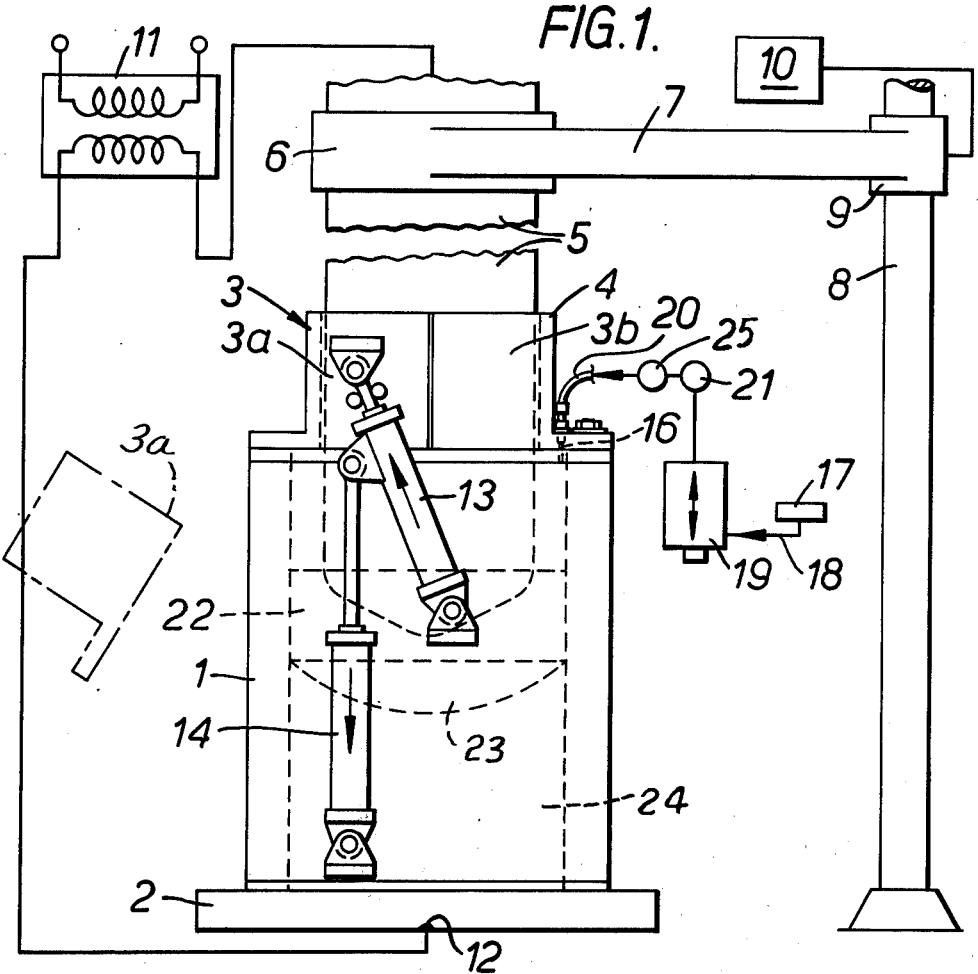

United States Patent [19]

Hoyle

[11] 4,022,264
[45] May 10, 1977

[54] ELECTROSLAG REFINING

[75] Inventor: Geoffrey Hoyle, Sheffield, England

[73] Assignee: British Steel Corporation, London, England

[22] Filed: Oct. 6, 1975

[21] Appl. No.: 620,186

[30] Foreign Application Priority Data

Nov. 4, 1974 United Kingdom ............ 47528/74

[52] U.S. Cl. .............................. 164/52; 164/252
[51] Int. Cl.² ........................................ B22D 27/00
[58] Field of Search ........................... 164/52, 252

[56] References Cited

UNITED STATES PATENTS

| 3,712,365 | 1/1973 | Paton et al. | 164/52 |
| 3,729,307 | 4/1973 | Plessing | 164/52 X |
| 3,805,876 | 4/1974 | Paton et al. | 164/252 |

FOREIGN PATENTS OR APPLICATIONS

| 2,314,206 | 10/1973 | Germany | 164/252 |
| 1,374,149 | 11/1974 | United Kingdom | 164/252 |

OTHER PUBLICATIONS

Medovar et al, "Electroslag Remelting", 1963, pp. 73-81.

Primary Examiner—Ronald J. Shore
Attorney, Agent, or Firm—Bacon & Thomas

[57] ABSTRACT

A hood for location above the upper surface of an electroslag mould comprises an upwardly extending tubular portion which defines an elongate opening through which a consumable electrode can be lowered into the mould. Dry air is conveyed to the interior of the upper section of the mould from a refrigerator, the air passing out from the mould through the annulus defined between the hood and the electrode.

7 Claims, 2 Drawing Figures

ELECTROSLAG REFINING

This invention relates to the electroslag refining process. In the electroslag refining process an electrically conductive slag within a mould is maintained in a molten state and at a temperature above the melting point of the metal to be refined. Unrefined metal is introduced into the mould and is refined as it passes in droplet form through a bath of the molten slag, refined droplets collecting to form a pool beneath the slag bath. The mould walls and mould base plate are cooled by the circulation of a coolant, normally water, and a solidified ingot is built up beneath the molten metal pool. The metal to be refined may be introduced to the mould in the form of one or more consumable electrodes and the slag maintained molten by passage of an electric current through the slag bath.

According to the present invention in one aspect electroslag refining apparatus for remelting an electrode fabricated from the metal to be refined comprises a cooled mould provided with a cover which includes an upwardly extending portion which defines an opening through which the electrode can be lowered into the mould and means for conveying dried air to the interior of the upper section of the mould. Preferably the cover comprises two sections divided along a line which passes through the opening of the cover to enable one such section to be removed from the mould with the consumable electrode in position. More than one consumable electrode may depend into the mould, each electrode extending through a corresponding opening formed in the cover. In this arrangement if the cover comprises two sections, it is divided along a line which passes through each of the openings of the cover.

According to the present invention in another aspect a method of remelting a consumable electrode by the electroslag refining process comprises the steps of forming a bath of molten electrically conductive slag within a cooled mould provided with a cover having a channel-like opening formed therein, depending the consumable electrode into the slag bath through the opening in the cover, passing an electric current from the electrode through the slag bath, and admitting to the mould a quantity of dried air which passes upwardly between the opposed surfaces of the electrode and the channel-like opening of the cover.

Figure 2:
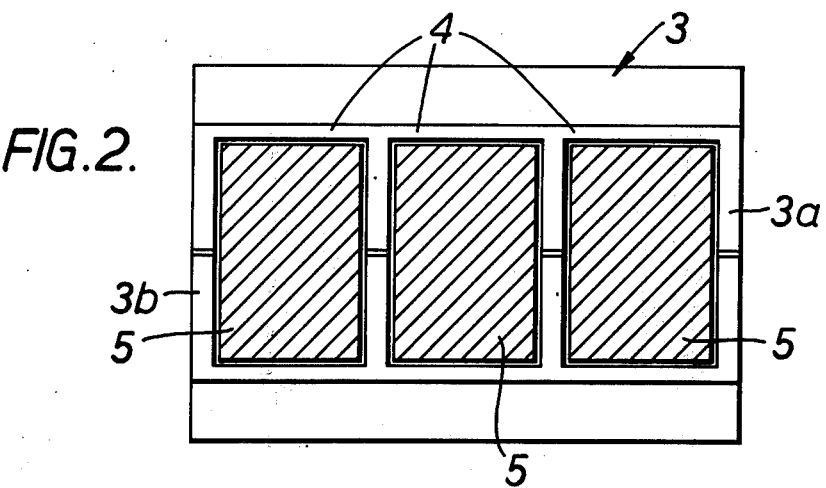

The invention will now be described by way of example with reference to the accompanying diagramatic drawing in which FIG. 1 is a side elevational view of electroslag refining apparatus in accordance with the invention; and FIG. 2 is a plan view from above, of a detail of the apparatus illustrated in FIG. 1.

The electroslag refining apparatus illustrated in the drawing comprises a cooled mould 1 of rectangular cross-section mounted on but electrically insulated from a base plate 2. The mould 1 is provided with a cover 3 which seats about the upper rim of the mould; a ring of electrically insulating material is positioned between the opposed surfaces of the cover 3 and the mould 1. The cover 3 includes upwardly extending channel-like portions 4 which define openings through each of which a consumable electrode 5 extends. Each electrode is supported by a clamp 6 located at one end of a horizontally extending arm 7 which is moveable vertically along a mast 8 by means of a carriage 9 driven by an electric motor 10. Each electrode is connected to receive current from an alternating current transformer 11. The return path to the transformer is via a connection 12 located on the base plate 2. As will be seen from the drawing the electrodes 5 and the base plate 2 are located in series in the secondary circuit of the transformer; the primary circuit of the transformer is connected to a mains supply. In an alternative arrangement direct current may be supplied to the electrodes or to the base plate.

The cover 3 comprises two sections 3a, 3b divided along a line which passes through the portion 4. The cover section 3a is removable from its seating on the mould by means of pneumatic cylinders 13, 14 cylinder 13 operating to lift the section 3a upwardly away from the mould and cylinder 14 operating to pivot the cover section into the position illustrated in broken line in FIG. 1.

A channel 16 is formed in a horizontally extending flange portion of the cover 3 to enable dried air (that is to say air which has a nil or minimal moisture content) to be supplied to the upper portion of the mould. Air from the atmosphere is drawn into a vertically moveable intake chamber 17 connected via flexible piping 18 to a refrigerator 19. A coolant, for example liquid nitrogen is circulated through conventional cooling coils located in the refrigerator to cause moisture content in the atmospheric air to condense on to the coils so that the air leaving the refrigerator through a pipe 20 coupled to the channel 16 has little or no moisture content in it. The dried air is supplied to the channel 16 at a positive pressure by a pump 21. To avoid local fluctuations in the rate at which the air is admitted to the channel 16, a reservoir 25 is positioned intermediate the pump and the channel. Means may be provided to remove the condensed moisture from the cooling coils of the refrigerator after each melt or after a predetermined time interval.

In operation a bath of electrically conductive molten slag 22 is formed in the mould 1; the consumable electrodes 5 are then lowered through the cover portions 4 into the slag bath and current passed through the slag via the electrodes 5 and base plate 2. The electrical current heats by electrical resistance the slag to a temperature at or above the melting point of the electrodes 5 to cause the electrode tips to melt. Droplets of molten metal from the electrodes are refined as they pass through the slag and collect to form a metal pool 23 which progressively solidifies to form a refined ingot 24.

During the course of the remelting process air from the atmosphere is drawn into the chamber 17, dried within the refrigerator 19 and admitted to the upper mould space via the pump 21, reservoir 25 and channel 16. On entering the mould the dried air is caused to flow downwardly by natural convection phenomena and is heated as it approaches the slag bath 22. The heated air then rises and leaves the mould via the spacing between the opposed surfaces of the electrodes and the cover portions 4. The removal of moisture from the air eliminates the possibilty of hydrogen being introduced from the atmosphere into the final ingot 24 by the absorption of water vapour into the slag 22. In addition, normal chemical reactions which may require the pressure of air instead of an inert atmosphere such as desulphurisation can proceed unimpeded.

If during the course of the process it is necessary to change the electrodes 5, for example, because the required final ingot weight is greater than the total weight of the consumable electrodes 5, the cover section 3a is removed by the pneumatic cylinders 13, 14 to the position indicated in broken line in FIG. 1. The electrodes can then be readily withdrawn from the mould and replaced by fresh electrodes without risk of damage to the cover 3 and with minimum risk of introducing hydrogen into the slag bath.

Although the invention has been described with reference to apparatus for remelting three electrodes, it is to be appreciated that the invention is equally applicable to arrangements in which only one, two or more than three electrodes are remelted. Similarly the invention is applicable to the production of ingots of round or square cross-section.

We claim:

1. In electroslag refining apparatus for remelting an electrode fabricated from the metal to be refined in the absence of hydrogen in atmospheric moisture and comprising a cooled mould provided with a cover having an opening through which the electrode can be lowered into the mould, the improvement which comprises drier means for receiving and drying air from the atmosphere, means for conveying dried air from said drying means to the interior of the upper section of the mould, the arrangement being such that during operation of the apparatus only the dried air from the drier means is admitted to the interior of the said upper section of the mould whereby the presence of hydrogen in atmospheric moisture is avoided.

2. Apparatus as claimed in claim 1 wherein the cover comprises two sections divided along a line which passes through the opening of the cover to enable one such section to be removed from the mould with the consumable electrode in position.

3. Apparatus as claimed in claim 2 wherein the cover is divided along a line which passes through each of the openings in the cover.

4. Apparatus as claimed in claim 1 wherein the cover is provided with a plurality of openings through each of which a consumable electrode may depend into the mould.

5. Apparatus as claimed in claim 1 wherein means for conveying dried air to the interior of the upper section of the mould includes an air intake chamber, for conveying air from the atmosphere to a refrigerator connected by piping to the upper mould section.

6. Apparatus as claimed in claim 5 wherein a pump is located within the piping intermediate the refrigerator and the mould.

7. A method of remelting a consumable electrode by the electroslag refining process in the absence of hydrogen in atmospheric moisture comprising the steps of forming a bath of molten electrically conductive slag within a cooled mould provided with a cover having an opening formed therein, depending the consumable electrode into the slag bath through the opening in the cover, passing an electric current from the electrode through the slag bath, and introducing to the upper section of the mould only a quantity of dried air which passes by convection upwardly through the opening formed in the cover to prevent the ingress of air from the atmosphere into said upper section so as to avoid the presence of hydrogen in atmospheric moisture.

* * * * *